(12) United States Patent
Schulz-Sciberras et al.

(10) Patent No.: US 12,053,824 B2
(45) Date of Patent: Aug. 6, 2024

(54) METHOD AND APPARATUS FOR TREATING COMBUSTIBLE AND/OR REACTIVE PARTICLES, METHOD OF OPERATING A SYSTEM FOR PRODUCING A THREE-DIMENSIONAL WORK PIECE AND SYSTEM FOR PRODUCING A THREE-DIMENSIONAL WORK PIECE

(71) Applicant: Nikon SLM Solutions AG, Lübeck (DE)

(72) Inventors: Matthew Schulz-Sciberras, Lübeck (DE); Patrick Sharp, Lübeck (DE)

(73) Assignee: Nikon SLM Slolutions AG, Lübeck (DE)

( * ) Notice: Subject to any disclaimer, the term of this patent is extended or adjusted under 35 U.S.C. 154(b) by 533 days.

(21) Appl. No.: 17/095,218

(22) Filed: Nov. 11, 2020

(65) Prior Publication Data
US 2021/0138397 A1 May 13, 2021

(30) Foreign Application Priority Data
Nov. 12, 2019 (DE) ...................... 10 2019 130 452.0

(51) Int. Cl.
*B01D 53/34* (2006.01)
*B01D 50/20* (2022.01)
(Continued)

(52) U.S. Cl.
CPC .............. *B22F 12/70* (2021.01); *B01D 50/20* (2022.01); *B01D 53/346* (2013.01); *B01D 53/38* (2013.01); *B01D 53/73* (2013.01); *B22F 1/145* (2022.01); *B22F 1/16* (2022.01); *B22F 10/28* (2021.01); *B22F 10/85* (2021.01); *B22F 12/90* (2021.01); *B33Y 40/00* (2014.12);
(Continued)

(58) Field of Classification Search
None
See application file for complete search history.

(56) References Cited

U.S. PATENT DOCUMENTS 5,527,019 A 6/1996 Schwarz

FOREIGN PATENT DOCUMENTS

DE 102017207415 A1 3/2017
DE 102017207415 A1 * 11/2018 .............. B22F 3/105
(Continued)

OTHER PUBLICATIONS

Office Action for German Patent Application No. 10 2019 130 452.0, German Patent and Trade Mark Office, Oct. 27, 2020.
European Patent Office, Extended European Search Report for EP Patent Application No. 20206659.3 1103, Mar. 29, 2021.

*Primary Examiner* — Daniel Berns
(74) *Attorney, Agent, or Firm* — Williams Mullen; Thomas F. Bergert

(57) ABSTRACT

In a method for treating combustible and/or reactive particles (34) which have been separated from a gas stream (32) by means of a separation device (36) an oxidizing agent is supplied to an atmosphere surrounding the particles (34) so as to cause a passivating oxidation of at least a part of the particles (34). A content of the oxidizing agent in the atmosphere surrounding the particles (34) is detected and the supply of the oxidizing agent to the atmosphere surrounding the particles (34) is controlled in dependence on the detected content of the oxidizing agent in the atmosphere surrounding the particles (34).

7 Claims, 5 Drawing Sheets

(51) Int. Cl.
- *B01D 53/38* (2006.01)
- *B01D 53/73* (2006.01)
- *B22F 1/145* (2022.01)
- *B22F 1/16* (2022.01)
- *B22F 10/28* (2021.01)
- *B22F 10/85* (2021.01)
- *B22F 12/70* (2021.01)
- *B22F 12/90* (2021.01)
- *B33Y 40/00* (2020.01)
- *B22F 10/00* (2021.01)
- *B22F 10/32* (2021.01)
- *B22F 10/322* (2021.01)
- *B22F 10/34* (2021.01)
- *B22F 10/77* (2021.01)
- *B33Y 10/00* (2015.01)
- *B33Y 30/00* (2015.01)

(52) U.S. Cl.
CPC ...... *B01D 2251/10* (2013.01); *B01D 2258/02* (2013.01); *B22F 10/00* (2021.01); *B22F 10/32* (2021.01); *B22F 10/322* (2021.01); *B22F 10/34* (2021.01); *B22F 10/77* (2021.01); *B33Y 10/00* (2014.12); *B33Y 30/00* (2014.12)

(56) References Cited

FOREIGN PATENT DOCUMENTS

| | | |
|---|---|---|
| DE | 102018221575 A1 | 12/2018 |
| EP | 2992942 A1 | 3/2014 |
| EP | 3431258 | 1/2019 |
| WO | 2020017952 | 1/2020 |
| WO | 2020120623 | 6/2020 |

\* cited by examiner

METHOD AND APPARATUS FOR TREATING COMBUSTIBLE AND/OR REACTIVE PARTICLES, METHOD OF OPERATING A SYSTEM FOR PRODUCING A THREE-DIMENSIONAL WORK PIECE AND SYSTEM FOR PRODUCING A THREE-DIMENSIONAL WORK PIECE

CROSS-REFERENCE TO RELATED APPLICATIONS

This application claims the priority benefit of German Patent Application No. 10 2019 130 452.0 filed on Nov. 12, 2019, which is hereby incorporated herein in its entirety by reference.

BACKGROUND OF THE INVENTION

The invention is directed to a method and an apparatus for treating combustible and/or reactive particles which have been separated from a gas stream by means of a separation device. Further, the invention is directed to a method of operating a system for producing a three-dimensional work piece by irradiating layers of a raw material powder with electromagnetic or particle radiation. Finally, the invention is directed to a system for producing a three-dimensional work piece by irradiating layers of a raw material powder with electromagnetic or particle radiation.

Powder bed fusion is an additive layering process by which pulverulent, in particular metallic, ceramic and/or plastic raw materials can be processed to three-dimensional work pieces of complex shapes. To that end, a raw material powder layer is applied onto a carrier and subjected to electromagnetic or particle radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production or repairing of prototypes, tools, replacement parts, high value components or medical prostheses, such as, for example, dental or orthopaedic prostheses, on the basis of CAD data.

An exemplary system for producing three-dimensional work pieces by powder bed fusion as described, for example, in EP 2 992 942 B1 comprises a process chamber accommodating a powder application device for successively applying layers of a raw material powder onto a carrier. An irradiation unit is provided for selectively irradiating a laser beam across the raw material powder layers. The process chamber is provided with a gas inlet and a gas outlet. Via the gas inlet, a gas, for example an inert gas is supplied to the process chamber. Within the process chamber, the gas stream takes up particulate impurities such as raw material powder particles and combustion products, for example welding smoke and soot particles. The gas/particle mixture exiting the process chamber is directed through a circulation line connecting the gas outlet of the process chamber to the gas inlet of the process chamber. A cyclone and a plurality of filters which are arranged in the circulation line serve to remove the particulate impurities from the gas stream before the gas stream is recirculated into the process chamber.

SUMMARY OF THE INVENTION

It is an object of the present invention to provide a method and an apparatus for treating combustible and/or reactive particles which have been separated from a gas stream by means of a separation device, wherein the method and the apparatus allow a reliable, safe and efficient handling of the combustible and/or reactive particles. Further, the present invention is directed to the object to provide a method of operating a system for producing a three-dimensional work piece by irradiating layers of a raw material powder with electromagnetic or particle radiation and a system for producing a three-dimensional work piece by irradiating layers of a raw material powder with electromagnetic or particle radiation which allow a reliable, safe an efficient handling of combustible and/or reactive particles which have been separated from a gas stream by means of a separation device.

These objects are addressed by a method for treating combustible and/or reactive particles as defined ire claim 1, an apparatus for treating combustible and/or reactive particles as defined in claim 13, a method of operating a system for producing a three-dimensional work piece as defined in claim 21 and a system for producing a three-dimensional work piece as defined in claim 22.

A method for treating combustible and/or reactive particles which have been separated from a gas stream by means of a separation device is described. The combustible and/or reactive particles may contain particles of a raw material powder which is processed in a system for producing a three-dimensional work piece by irradiating layers of the raw material powder with electromagnetic or particle radiation. Alternatively or additionally thereto, the combustible and/or reactive particles may contain combustion products generated upon irradiating the raw material powder layers with electromagnetic or particle radiation, such as welding smoke and/or soot particles and metal condensate. Specifically, the combustible and/or reactive particles may contain particles having a particle size in the range from 1 μm to 100 μm, but may also contain agglomerates having a particle size 100 μm and particles having particle sizes≤1 μm.

The separation device may comprise at least one filter and/or at least one cyclone. The separation device may be suitable to separate the particles contained in the gas stream from the gas stream such that a purified gas stream, i.e. a gas stream that contains less particles than the gas stream entering the separation device exits the separation device. The gas stream preferably is an inert gas stream and may contain, for example, argon or nitrogen so as to prevent an undesired oxidation of the combustible and/or reactive particles. Specifically, the gas stream may be a gas stream that is circulated through a process chamber of a system for producing a three-dimensional work piece by irradiating layers of a raw material powder with electromagnetic or particle radiation in order to build up an inert gas atmosphere within the process chamber and in order to discharge particulate impurities such as raw material powder particles, welding smoke and/or soot particles from the process chamber. It is, however, also conceivable that the gas stream is a gas stream that is used in a system for producing a three-dimensional work piece by irradiating layers of a raw material powder with electromagnetic or particle radiation for conveying raw material powder through a raw material powder circuit of the system.

In the method for treating a gas stream, an oxidizing agent is supplied to an atmosphere surrounding the particles so as to cause a passivating oxidation of at least a part of the particles. Specifically, the combustible and/or reactive particles, upon coming into contact with the oxidizing agent, react with the oxidizing agent so as to form a passivating surface layer around the particles. Within the context of this application, the term "passivating oxidation" thus should describe an oxidation reaction which leads to a reduction of the reactivity and/or combustibility of the particles. For metal particles it is typically sufficient to form a metal oxide surface layer with a thickness of a few nanometers for preventing an uncontrolled pyrophoric oxidation. The oxidizing agent may be a fluid, i.e. a liquid or a gas. Further, the oxidizing agent may be supplied to the atmosphere surrounding the particles continuously or in cycles.

A content of the oxidizing agent in the atmosphere surrounding the particles is detected. The content of the oxidizing agent in the atmosphere surrounding the particles may be used as a measure for the consumption of oxidizing agent in the oxidation reaction in order to form a passivating surface layer on the combustible and/or reactive particles. Consequently, by detecting the content of the oxidizing agent in the atmosphere surrounding the particles, the passivating oxidation of the combustible and/or reactive particles and in particular the progress of the oxidation reaction may be monitored. The content of the oxidizing agent in the atmosphere surrounding the particles may be detected, for example, by means of an oxygen sensor.

The supply of the oxidation agent to the atmosphere surrounding the particles is controlled in dependence on the detected content of the oxidizing agent in the atmosphere surrounding the particles. Thus, in the method for treating a gas stream, the supply of the oxidation agent to the atmosphere surrounding the particles is controlled in dependence on the status and the progress of the oxidation reaction occurring with the particles. As a result, an uncontrolled oxidation of the combustible and/or reactive particles which may be caused by an excessive supply of oxidation agent to the atmosphere surrounding the particles can be prevented. At the same time, the supply of the oxidation agent to the atmosphere surrounding the particles may be controlled in such a manner that there is always a sufficient amount of oxidation agent present in the atmosphere surrounding the particles in order to allow for an efficient oxidation process to occur. As a result, a safe, reliable and efficient handling of the combustible and/or reactive particles is made possible.

The particles that are separated from the gas stream by means of the separation device may be supplied to a collecting vessel. In this case, the atmosphere surrounding the particles is formed by an atmosphere within the collection vessel. The collecting vessel may be connected to only one component, for example to only one filter or only one cyclone of the separation device. It is, however, also conceivable that particles separated from a plurality of filters and/or cyclones are supplied to a common collecting vessel. For example, the collecting vessel may be connected to at least one filter in such a manner that particulate material that is trapped in the filter upon guiding the gas stream containing combustible and/or reactive particles through the filter is directed into the collecting vessel when the filter is periodically cleaned, for example by a "back-flush" method. Further, the oxidizing agent may be supplied to the collecting vessel. A content of the oxidizing agent in the collecting vessel may be detected. A supply of the oxidizing agent to the collecting vessel may be controlled in dependence on the detected content of the oxidizing agent in the collecting vessel.

Basically, it is conceivable that the oxidizing agent is supplied to the collecting vessel already while the particles that are separated from the gas stream by means of the separation device are supplied to the collecting vessel. Preferably, however, the supply of particles to the collecting vessel is interrupted before the supply of the oxidizing agent to the collecting vessel is started. As a result, the amount of combustible and/or reactive particles remains constant during the oxidation process which allows an easier and more accurate control of the oxidation process. The supply of particles to the collecting vessel may, for example, be interrupted by closing a valve disposed in a connecting line connecting the separation device to the collecting vessel.

The supply of particles to the collecting vessel may be interrupted as required, i.e. at any time. Preferably, however, the supply of particles to the collecting vessel is interrupted at least when a filling level of the collecting vessel has reached a predetermined filling level. The filling level of the collecting vessel may be determined by means of at least one filling level sensor. A series of e.g. three filling level sensors which may be evenly distributed in the collecting vessel may also be employed. Additionally and/or alternatively, a scale may be used in order to determine the filling level of the collecting vessel. The filling level sensor may be designed in the form of a laser filling level sensor or an in-place sensor. The scale may be designed in the form of a three-point scale.

During the interruption of the supply of particles to the collecting vessel, also the supply of the gas stream to the separation device may be interrupted. Preferably, however, the supply of the gas stream to be treated to the separation device and the step of separating at least a part of the particles contained in the gas stream from the gas stream by means of the separation device is continued during the interruption of the supply of particles to the collecting vessel. As a result, the procedural efficiency can be enhanced. The particles that are separated from the gas stream during the interruption of the supply of particles to the collecting vessel may be temporarily stored in an interim storage volume.

The interim storage volume may be provided in the separation device. For example, particles separated from the gas stream may maintain in a filter of the separation device until the end of the interruption of the supply of particles to the collecting vessel. It is, however, also conceivable to use a separate storage tank as the interim storage volume. For example, an interim storage volume which is designed in the form of a separate storage tank may be installed in the connecting line between the separation device and the collecting vessel.

In a preferred embodiment of the method for treating combustible and/or reactive particles, the oxidizing agent is gaseous oxygen. Alternatively or additionally thereto, the oxidizing agent may be supplied to the collecting vessel in a diluted form. Specifically in case gaseous oxygen is used as the oxidizing agent, the supply of the oxidizing agent to the atmosphere surrounding the particles in a diluted form allows a reliable control of the passivating oxidation of in particular highly reactive and/or highly combustible particles such as, for example, titanium particles. For example, oxidizing agent in the form of gaseous oxygen may be supplied to the atmosphere surrounding the particles together with a diluting agent in the form of an inert gas such as, for example argon, in particular 99% pure Argon, Pure oxygen and inert gas may be supplied to the atmosphere surrounding the particles. Preferably, however, air having an oxygen content of approximately 21% and inert gas is supplied to the atmosphere surrounding the particles.

The oxidizing agent and a diluting agent may be separately supplied to the atmosphere surrounding the particles so as to form an oxidizing mixture containing the oxidizing agent and the diluting agent in the atmosphere surrounding the particles. Alternatively or additionally, the oxidizing agent and the diluting agent may be premixed in a mixing chamber so as to form an oxidizing mixture containing the oxidizing agent and the diluting agent in the mixing chamber before the oxidizing mixture is supplied to the atmosphere surrounding the particles. The mixing chamber may comprise an oxidizing agent inlet which may be connected to an oxidizing agent source. The supply of oxidizing agent to the mixing chamber via the oxidizing agent inlet may be controlled by means of an oxidizing agent supply valve. Further, the mixing chamber may comprise a diluting agent inlet which may be connected to a diluting agent source. The supply of diluting agent to the mixing chamber via the diluting agent inlet may be controlled by means of a diluting agent supply valve. The mixing chamber may also be provided with an oxidizing mixture outlet which may be connected to the collecting vessel, for example via an oxidizing mixture supply line. The discharge of the oxidizing mixture from the mixing chamber to the collecting vessel via the oxidizing mixture outlet of may be controlled by means of an oxidizing mixture discharge valve.

The oxidizing agent and/or the diluting agent may be supplied to the mixing chamber with an increased pressure, i.e. with a pressure which exceeds the ambient pressure, in order to allow mixing of the oxidizing agent and the diluting agent in a turbulent flow inside the mixing chamber. The mixing chamber may be provided with a pressure control valve which allows the discharge of excess oxidizing mixture from the mixing chamber. The presence of the pressure control valve assists the mixing of the oxidizing agent with the diluting agent in the mixing chamber and prevents that the pressure within the mixing chamber exceeds a desired maximum value.

The supply of oxidizing agent and the supply of diluting agent to the atmosphere surrounding the particles and/or to the mixing chamber may be controlled in such a manner that the content of the oxidizing agent in oxidizing mixture increases over time. As a result, the desired increase of the content of the oxidizing agent in the atmosphere surrounding the particles may be achieved without excessively increasing the volume flow of oxidizing mixture to the atmosphere surrounding the particles.

The supply of the oxidizing agent to the atmosphere surrounding the particles may be controlled in such a manner that the content of gaseous oxygen in the atmosphere surrounding the particles, at least during a first period of time following a start of the supply of the oxidizing agent to the atmosphere surrounding the particles, is maintained at a level which allows a passivating oxidation of at least a part of the particles, but which is lower than an ambient oxygen content. For example, the supply of the oxidizing agent to the atmosphere surrounding the particles may be controlled in such a manner that the content of gaseous oxygen in the atmosphere surrounding the particles is maintained at level below the Limiting Oxygen Concentration (LOC) for combustion of the particles of a particular material.

Upon start of the supply of the oxidizing agent of the atmosphere surrounding the particles, a rapid oxidation reaction may occur, wherein the oxidation rate depends on the type and the reactivity of the particles. For example, aluminum and in particular titanium particles are highly reactive, specifically in case the particles were previously handled in a pure inert gas atmosphere which did not allow the formation of a passivating oxide layer on the surface of the particles. Controlling the supply of the oxidizing agent to the atmosphere surrounding the particles during a starting phase of the oxidation process in such a manner that the content of gaseous oxygen in the atmosphere surrounding the particles is lower than an ambient oxygen content prevents an excess supply of oxidation agent to the atmosphere surrounding the particles and hence a too rapid progress of oxidation reaction.

Preferably, the supply of the oxidizing agent to the atmosphere surrounding the particles is controlled in such a manner that a content of gaseous oxygen in the atmosphere surrounding the particles, at least during the second period of time preceding a completion of the supply of the oxidizing agent to the atmosphere surrounding the pellicles, approximates an ambient oxygen content. The ambient oxygen content may be approximately 21%. Controlling the supply of the oxidizing agent to the atmosphere surrounding the particles in such a manner that the oxygen content of the atmosphere surrounding the particles approximates the oxygen content of air reliably prevents an undesired reaction of the combustible and/or reactive particles when the particles are exposed to air, for example upon opening a collecting vessel accommodating the particles.

Upon completion of the passivating oxidation of the combustible and/or reactive particles, i.e. for example when the content of gaseous oxygen in the atmosphere surrounding the particles is approximately 21%, the supply of the oxidizing agent to the atmosphere surrounding the particles may be finally interrupted. A collecting vessel accommodating the particles then may be replaced by a replacement collecting vessel. For example, the collecting vessel may be detached from a connecting line connecting the collecting vessel to the separation device and the replacement collecting vessel may be connected to the connecting line. After completion of the replacement step, an inert gas atmosphere may be established in the replacement collecting vessel and the valve disposed in the connecting line may be reopened so as to allow the supply of particles from the separation device now to the replacement collecting vessel.

In a preferred embodiment of the method for treating combustible and/or reactive particles, the supply of the oxidizing agent to the atmosphere surrounding the particles may be controlled in dependence on a pressure in the atmosphere surrounding the particles, in particular in dependence on a pressure in a collecting vessel accommodating the particles. The pressure in the atmosphere surrounding the particles and in particular in a collecting vessel accommodating the particles is a parameter indicative of the progress and the intensity, i.e. the decree of the passivating oxidation of the combustible and/or reactive particles. Thus, the supply of the oxidizing agent to the atmosphere surrounding the particles may be controlled in such a manner that a desired pressure development in the atmosphere surrounding the particles and in particular in the collecting vessel accommodating the particles is achieved.

For example, the supply of oxidizing agent to the atmosphere surrounding the particles may be controlled in such a manner that undesired pressure peaks, which indicate an uncontrolled oxidation reaction, are avoided. This may, for example, be achieved by suitably controlling flow rate of oxidizing agent which is supplied to the atmosphere surrounding the particles. On the other hand, the absence of an increase of the pressure in the atmosphere surrounding the particles despite a continued supply of oxidizing agent to the atmosphere surrounding the particles indicates an advanced or even complete state of the passivating oxidation of the reactive particles.

The supply of the oxidizing agent to the atmosphere surrounding the particles may be controlled in such a manner that the pressure in the atmosphere surrounding the particles does not exceed a threshold value. For controlling the pressure in the atmosphere surrounding the particles, a collecting vessel accommodating the particles may be equipped with a pressure control valve which automatically opens in case the pressure in the collecting vessel exceeds the threshold value. Alternatively or additionally thereto, the pressure in the collecting vessel may be detected, for example by means of a suitable pressure sensor, and the pressure control valve may be operated under the control of a control unit based on the pressure value detected by means of the pressure sensor.

In a particular preferred embodiment of the method for treating combustible and/or reactive particles, the oxidizing agent is supplied to the atmosphere surrounding the particles in cycles. During a supply cycle of the oxidizing agent to the atmosphere surrounding the particles and in particular to a collecting vessel accommodating the particles, a pressure equalisation may be initiated. For example, a pressure equalisation in the atmosphere surrounding the particles may be achieved by suitably controlling a pressure control valve. The pressure control valve may, for example, be connected to a collecting vessel accommodating the particles.

Following the supply cycle of the oxidizing agent, i.e. after interrupting the supply of the oxidizing agent, a variation of the pressure in the atmosphere surrounding the particles and in particular in a collecting vessel accommodating the particles may be determined. For example, a control unit may determine the pressure variation, in particular a pressure increase based on signal provided from the pressure sensor. A further supply cycle of the oxidizing agent to the atmosphere surrounding the particles then may be controlled in dependence on the determined pressure variation in the atmosphere surrounding the particles.

In a further preferred embodiment of the method for treating combustible and/or reactive particles, a temperature in the atmosphere surrounding the particles may be detected. In particular a temperature in a collecting vessel accommodating the particles may be detected. The supply of the oxidizing agent to the atmosphere surrounding the particles may be controlled hi dependence on the detected temperature hi the atmosphere surrounding the particles.

The supply of the oxidizing agent to the atmosphere surrounding the particles may be controlled in such a manner that the temperature in the atmosphere surrounding the particles does not exceed a threshold value. For example, the supply of the oxidizing agent to the atmosphere surrounding the particles may be controlled in such a manner that the temperature in the atmosphere surrounding the particles does not exceed 45° C. The temperature in the atmosphere surrounding the particles may be detected, for example by means of a suitable temperature sensor.

In a preferred embodiment of the method for treating combustible and/or reactive particles, the particles are stirred and/or revolved. In particular, the particles accommodated in the collecting vessel are stirred and/or revolved by means of a mechanical stirring and/or revolving device. The stirring and/or revolving device may be detachably accommodated in the collecting vessel. By stirring and/or revolving the particles, and enhanced mixing of the particles and the oxidation agent can be achieved. In addition, particle agglomerates can be broken up which may further promote the passivating oxidation of the particles.

Further, an apparatus for treating combustible and/or reactive particles which have been separated from a gas stream by means of a separation device is described. The apparatus comprises an oxidizing agent supply system configured to supply an oxidizing agent to an atmosphere surrounding the particles so as to cause a passivating oxidation of at least a part of the particles. The apparatus further comprises an oxidizing agent detector which is configured to detect a content of the oxidizing agent in the atmosphere surrounding the particles. Finally, the apparatus comprises a control unit which is configured to control the supply of the oxidizing agent to the atmosphere surrounding the particles in dependence on the content of the oxidizing agent in the atmosphere surrounding the particles which is detected by means of the oxidizing agent detector.

The apparatus may comprise a collecting vessel which is connectable to the separation device and which is configured to accommodate the particles separated from the gas stream by means of the separation device. The oxidizing agent supply system may be configured to supply the oxidizing agent to collecting vessel, the oxidizing agent detector may be configured to detect a content of the oxidizing agent in the collecting vessel and the control unit may be configured to control the supply of the oxidizing agent to the collecting vessel in dependence on the content of the oxidizing agent in the collecting vessel which is detected by means of the oxidizing agent detector.

The oxidizing agent may be gaseous oxygen and/or may be supplied to the collecting vessel in a diluted form. The oxidizing agent supply system may be configured to separately supply the oxidizing agent and a diluting agent to the atmosphere surrounding the particles so as to form an oxidizing mixture in the atmosphere surrounding the particles. Alternatively or additionally, the oxidizing agent supply system of the apparatus may comprise a mixing chamber which may serve to mix the oxidizing agent with the diluting agent. The mixing chamber may comprise an oxidizing agent inlet which may be connected to an oxidizing agent source. The oxidizing agent source may be an air source which provides air having an oxygen content of approximately 21%. An oxidizing agent supply valve may be provided for controlling the supply of oxidizing agent to the mixing chamber via the oxidizing agent inlet.

Further, the mixing chamber may comprise a diluting agent inlet which may be connected to a diluting agent source. The diluting agent source may be an inert gas source, in particular an Argon source containing 99% pure Argon. A diluting agent supply valve may be provided for controlling the supply of diluting agent to the mixing chamber via the diluting agent inlet. The mixing chamber may also be provided with an oxidizing mixture outlet which may be connected to the atmosphere surrounding the particles, for example via an oxidizing mixture supply line. An oxidizing mixture discharge valve may be provided for controlling the discharge of the oxidizing mixture from the mixing chamber to the atmosphere surrounding the particles via the oxidizing mixture outlet.

The control unit may be configured to control the supply of the oxidizing agent and the supply of to the diluting agent to the atmosphere surrounding the particles and/or to the mixing chamber in such a manner that the content of the oxidizing agent in the oxidizing mixture increases over time.

Alternatively or additionally thereto, the control unit may also be configured to control the supply of the oxidizing agent to the atmosphere surrounding the particles in such a manner that the content of gaseous oxygen in the atmosphere surrounding the particles, at least during a first period of time following a start of the supply of the oxidizing agent to the atmosphere surrounding the particles, is maintained at a level which allows a passivating oxidation of at least a part of the particles, but which is lower than an ambient oxygen content or even lower than the Limiting Oxygen Concentration (LOC) for combustion of the particles of a particular material.

Alternatively or additionally thereto, the control unit may also be configured to control the supply of the oxidizing agent to the atmosphere surrounding the particles in such a manner that the content of gaseous oxygen in the atmosphere surrounding the particles, at least during a second period of time preceding a completion of the supply of the oxidizing agent to the atmosphere surrounding the particles, approximates an ambient oxygen content, in particular approximately 21%.

In a preferred embodiment, the apparatus may further comprise at least one pressure sensor which is configured to detect the pressure in the atmosphere surrounding the particles and hi particular in a collecting vessel accommodating the particles. The control unit may be configured to control the supply of the oxidizing agent to the atmosphere surrounding the particles in dependence on the pressure in the atmosphere surrounding the particles which is detected by means of the at least one pressure sensor. In particular, the control unit may be configured to control the supply of the oxidizing agent to the atmosphere surrounding the particles in such a manner that the pressure in the atmosphere surrounding the particles does not exceed a threshold value.

The control unit may further be configured to control the supply of the oxidizing agent to the atmosphere surrounding the particles hi such a manner that the oxidizing agent is supplied to the atmosphere surrounding the particles in cycles. For example, the control unit may control a suitable valve so as to allow or interrupt the supply of oxidizing agent to the atmosphere surrounding the particles as needed. Following a supply cycle of the oxidizing agent, i.e. after interrupting the supply of oxidizing agent, the control unit may be configured to determine a variation of the pressure in the atmosphere surrounding the particles based on a signal received from the at least one pressure sensor. Finally, the control unit may be configured to control a further supply cycle of the oxidizing agent to the atmosphere surrounding the particles in dependence on the determined pressure variation in the atmosphere surrounding the particles.

The apparatus may further comprise at least one temperature sensor configured to detect a temperature in the atmosphere surrounding the particles. The control unit may be configured to control the supply of the oxidizing agent to the atmosphere surrounding the particles in dependence on the temperature in the atmosphere surrounding the particles which is detected by means of the at least one temperature sensor. In particular, the control unit may be configured to control the supply of the oxidizing agent to the atmosphere surrounding the particles in such a manner that the temperature in the atmosphere surrounding the particles does not exceed a threshold value.

Finally, the apparatus may comprise a stirring and/or revolving device for stirring and/or revolving the particles. The stirring and/or revolving device preferably is designed in the form of a mechanical stirring and/or revolving device. Further, the stirring and/or revolving device may be detachably accommodated in the collecting vessel.

In a method of operating a system for producing a three-dimensional work piece by irradiating layers of a raw material powder with electromagnetic or particle radiation the gas stream is supplied to the process chamber of the system. The gas stream preferably is an inert gas stream and may contain, for example, argon or nitrogen. The gas stream is directed through the process chamber in order to establish a controlled gas atmosphere, in particular a controlled inert gas atmosphere within the process chamber. While being directed through the process chamber the gas stream takes up combustible and/or reactive particles, such as, for example, raw material powder particles, welding smoke and soot particles and metal condensate. The gas stream containing the combustible and/or reactive particles is discharged from the process chamber. By keeping the gas atmosphere within the process chamber as dean as possible, shielding of a radiation beam by particulate impurities and hence reduction of irradiation efficiency is minimized. The combustible and/or reactive particles are separated from the gas stream by means of a separation device. The combustible and/or reactive particles separated from the gas stream are treated in accordance with the above described method.

After separating the combustible and/or reactive particles from the gas stream, a purified gas stream which exits the separation device separating at least a part of the particles contained in the gas stream from the gas stream may be recirculated to the process chamber of the system.

A system for producing a three-dimensional work piece by irradiating layers of a raw material powder with electromagnetic or particle radiation comprises a gas supply system configured to supply a gas stream to a process chamber of the system and to direct the gas stream through the process chamber. While being directed through the process chamber, the gas stream takes up combustible and/or reactive particles. The system further comprises a gas discharge system configured to discharge the gas stream containing the combustible and/or reactive particles from the process chamber and a separation device configured to separate the combustible and/or reactive particles from the gas stream. Finally, the system comprises an above-described apparatus for treating combustible and/or reactive particles.

BRIEF DESCRIPTION OF THE DRAWINGS

Preferred embodiments of the invention will be described in greater detail with reference to the appended schematic drawings, wherein.

DETAILED DESCRIPTION OF THE PREFERRED EMBODIMENTS

Figure 1:
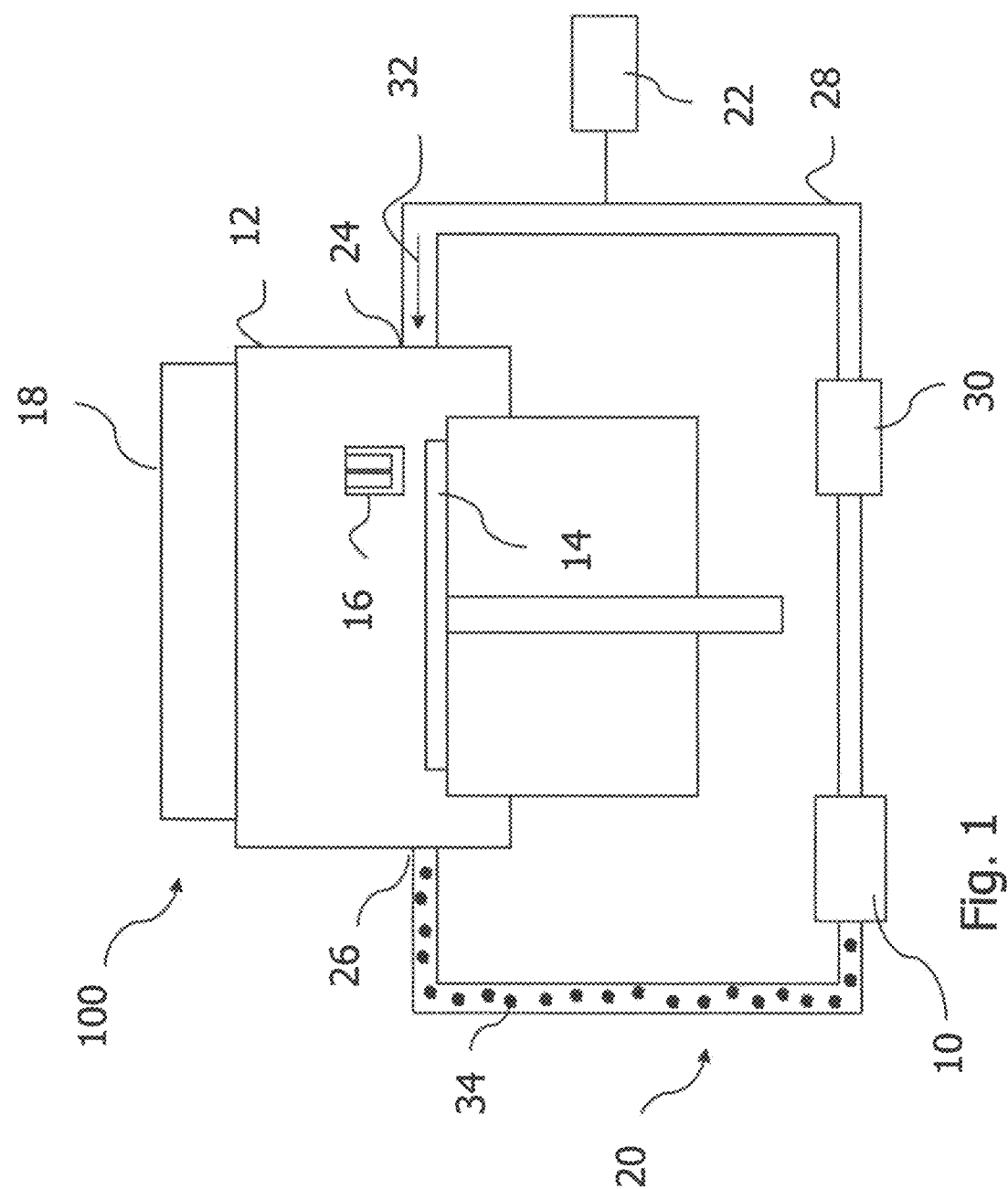
FIG. 1 shows a system for producing a three-dimensional work piece by irradiating layers of a raw material powder with electromagnetic or particle radiation which is equipped with gas circuit for directing the gas stream through a process chamber of the system.
Figure 2:
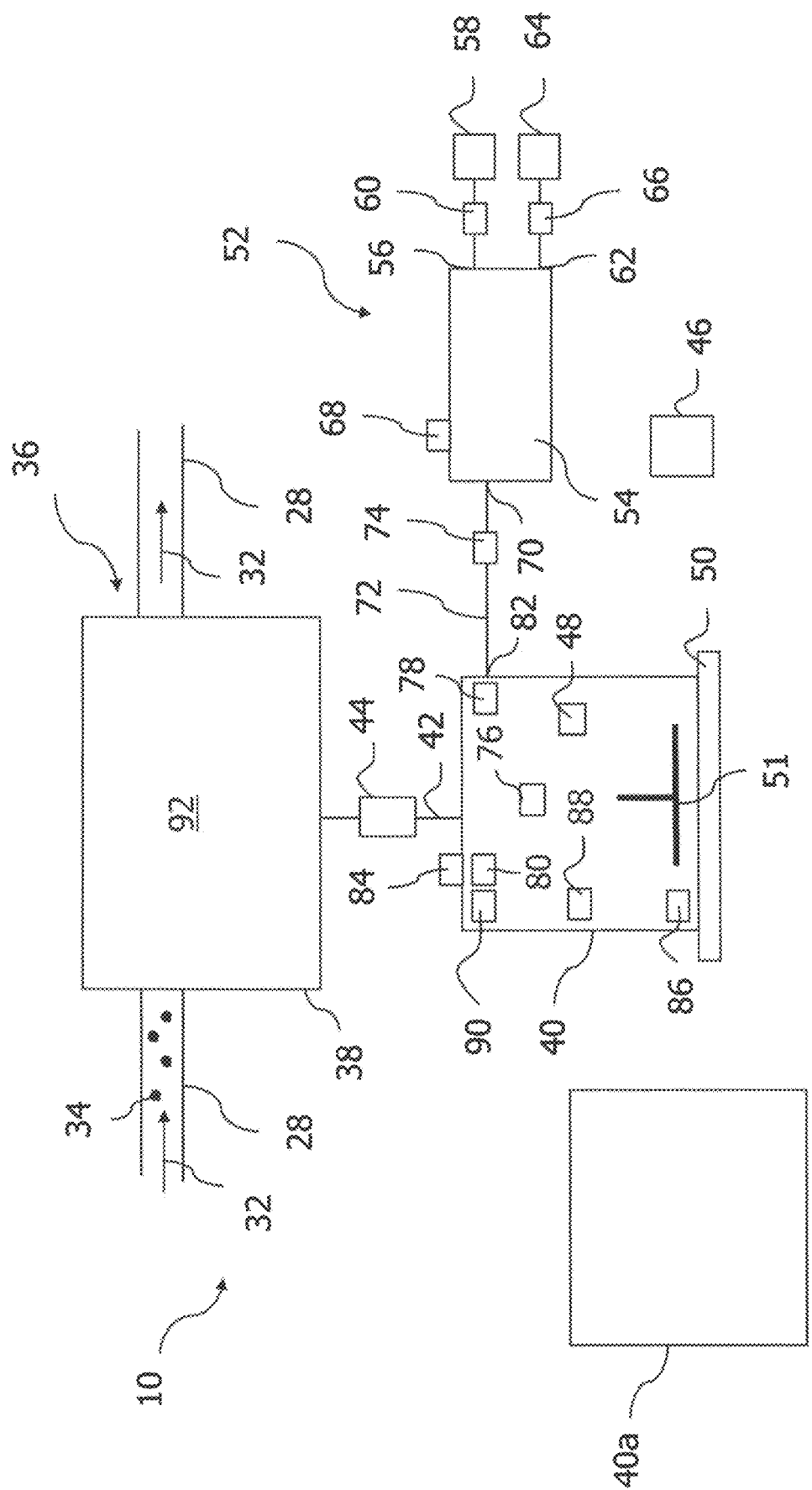
FIG. 2 shows a detailed view of an apparatus for treating combustible and/or reactive particles contained in a gas stream which is discharged from the process chamber of the system according to FIG. 1.

FIG. 1 shows a system 100 for producing a three-dimensional work piece by an additive layering process. The system 100 comprises a process chamber 12 accommodating carrier 14 and a powder application device 16 for applying a raw material powder onto the carrier 14. The process chamber 12 is sealable against the ambient atmosphere, i.e. the environment surrounding the process chamber 12. The system 100 further comprises an irradiation device 18 for selectively irradiating electromagnetic or particle radiation onto the raw material powder applied onto the carrier 14.

A gas circuit 20 is provided so as to establish a controlled gas atmosphere within the process chamber 12. The gas circuit 20 contains a gas source 22. The gas source 22 in particular is designed in the form of an inert gas source, for example in the form of an argon or nitrogen source. The process chamber 12 comprises a gas inlet 24 for supplying gas to the process chamber 12. A gas outlet 26 serves to discharge gas from the process chamber 12. A circulation line 28 connects the gas outlet 26 to the gas inlet 24. Further, the circulation line 28 is connected to the gas source 22. A conveying device 30 serves to convey the gas stream through the circulation line 28.

Upon being directed through the process chamber 12, a gas stream 32 supplied to the process chamber 12 via the gas inlet 24 takes up combustible and/or reactive particles 34 such as raw material powder particles, welding smoke and/or soot particles. Thus, the gas source 22, the gas inlet 24, the circulation line 28 and the conveying device 30 define a gas supply system which is configured to supply the gas stream 32 to the process chamber 12, whereas the gas outlets 26, the circulation line 28 and the conveying device 30 define a gas discharge system which is configured to discharge the gas stream 32 containing the combustible and/or reactive particles 34 from the process chamber 12. The gas/particle mixture exiting the process chamber 12 via the gas outlet 26 is treated in a separation device 36 which serves to separate the particles 34 contained in the gas stream 32 from the gas stream 32 before being recirculated to the process chamber 12 via the circulation line 28 and the gas inlet 24.

The separation device 36 is disposed in the circulation line 28 upstream of the conveying device 30. The purified gas stream 32 exiting the separation device 36 is recirculated to the process chamber 12 via the circulation line 28 and the gas inlet 24. In the embodiment shown in the drawings, the separation device 36 comprises a filter 38 for filtering the particles 34 from the gas stream 32. It is, however, also conceivable that the separation device 36 comprises a plurality of filters and/or one or more cyclone(s).

The separation device 36 is connected to a collecting vessel 40 of an apparatus 10 for treating the combustible and/or reactive particles 34 which have been separated from the gas stream 32 by means of the separation device 36 via a connecting line 42. The collecting vessel 40 serves to accommodate the particulate material 34 that is trapped in the filter 38 of the separation device 36 when the gas stream 32 is directed through the filter 38 and that is removed from the filter 38 upon continuously or periodically cleaning the filter 38, for example by a "back-flush" method. The supply of particles 34 from the filter 38 to the collecting vessel 40 is controlled by means of a valve 44 which is disposed in the connecting line 42. Operation of the valve 44 is controlled by means of an electronic control unit 46. It is, however, also conceivable that the valve 44 is designed in the form of a manually controllable valve. A filling level of the collecting vessel 40 is controlled by means of a filling level sensor 48 and a scale 50. The scale 50 is designed in the form of three-point scale. Signals that are output by the filling level sensor 48 and the scale 50 are transmitted to the electronic control unit 46. A mechanical stirring and/or revolving device 51 is detachably accommodated in the collecting vessel 40.

Further, the apparatus 10 comprises an oxidizing agent supply system 52 which is configured to supply an oxidizing agent to an atmosphere surrounding the particles 34, i.e. to an atmosphere within the collecting vessel 40. In the embodiment of the apparatus 10 shown in the drawings, the oxidizing agent which is supplied to the atmosphere surrounding the particles 34 by means of the oxidizing agent supply system 50 is gaseous oxygen. Specifically, gaseous oxygen which acts as the oxidizing agent is supplied to the atmosphere surrounding the particles 34 by means of the oxidizing agent supply system 50 in a diluted form as an ingredient of an oxidizing mixture which also includes a diluting agent.

The oxidizing agent supply system 52 comprises a mixing chamber 54 which serves to mix the oxidizing agent with the diluting agent in order to obtain the oxidizing mixture. The mixing chamber 54 comprises an oxidizing agent inlet 56 which is connected to an oxidizing agent source 58. In the embodiment of the apparatus 10 shown in the drawings, the oxidizing agent source 58 is designed in the form of an air source which provides air having an oxygen content of approximately 21%. An oxidizing agent supply valve 60 is provided for controlling the supply of oxidizing agent to the mixing chamber 54 via the oxidizing agent inlet 56.

Further, the mixing chamber 56 comprises a diluting agent inlet 62 which is connected to a diluting agent source 64. The diluting agent source 64 is designed in the form an inert gas source, in particular an Argon source containing 99% pure Argon, A diluting agent supply valve 66 is provided for controlling the supply of diluting agent to the mixing chamber 54 via the diluting agent inlet 62. During operation of the apparatus 10, the oxidizing agent and the diluting agent are supplied to the mixing chamber 54 of the oxygen agent supply system 52 with an increased pressure, i.e. with a pressure which exceeds the ambient pressure. As a result, the oxidizing agent, i.e. the air containing the oxidizing agent gaseous oxygen, and the diluting agent Argon are mixed in a turbulent flow which develops inside the mixing chamber 54.

In order to assist the mixing of the oxidizing agent with the diluting agent in the mixing chamber 54 and in order to prevent that the pressure within the mixing chamber 54 exceeds a desired maximum value, the mixing chamber 54 is provided with a pressure control valve 68 which allows the discharge of excess oxidizing mixture from the mixing chamber 54. The pressure control valve 68 may be designed in the form of an automatic pressure control valve which automatically opens in case the pressure in the mixing chamber 56 exceeds a threshold value. It is, however, also conceivable that the pressure control valve 68 is controlled by means of the control unit 46 based on a measured pressure value which detected by means of a pressure sensor (not shown) within the mixing chamber 54.

The oxidizing mixture, i.e. the mixture of air and Argon is discharged from the mixing chamber 54 via an oxidizing mixture outlet 70. The oxidizing mixture outlet 70 is connected to the atmosphere surrounding the particles 34, i.e. the collecting vessel 40 via an oxidizing mixture supply line 72. An oxidizing mixture discharge valve 74 is provided in the oxidizing mixture supply line 72 for controlling the discharge of the oxidizing mixture from the mixing chamber 54 to the atmosphere surrounding the particles 34. The supply of the oxidizing agent to the mixing chamber 54, the supply of the diluting agent to the mixing chamber 54 and the discharge of the oxidizing mixture from the mixing chamber 54 happen under the control of the control unit 46.

In particular, the control unit 46 controls the valves 60, 66, 74 in a suitable way in order to control the supply of the oxidizing agent to the mixing chamber 54, the supply of the diluting agent to the mixing chamber 54 and the discharge of the oxidizing mixture from the mixing chamber 54 as desired.

The apparatus 10 further comprises an oxidizing agent detector 76 which is arranged within the collecting vessel 40 and which is configured to detect a content of the oxidizing agent in the atmosphere surrounding the particles 34, i.e. in collecting vessel 40. In the embodiment of the apparatus 10 shown in the drawings, the oxidizing agent detector 76 is designed in the form of an oxygen detector which is configured to detect the amount of gaseous oxygen present in the collecting vessel 40.

Further, two pressure sensors 78, 80 are arranged within the collecting vessel 40 in order to detect the pressure prevailing in the atmosphere surrounding the particles 34, i.e. in the collecting vessel 40. A first pressure sensor 78 is arranged in the region of an oxidizing agent inlet 82 of the collecting vessel 40 via which the collecting vessel 40 is connected to the oxidizing agent supply system 52, i.e. the oxidizing mixture supply line 72. A second pressure sensor 80 is arranged in the region of a pressure control valve 84 via which excess gas can be discharged from the interior of the collecting vessel 40. The pressure control valve 84 may be designed in the form of an automatic valve which automatically opens in case the pressure in the collecting vessel 40 exceeds a threshold value. It is, however, also conceivable to operate the pressure control valve 84 under the control of the control unit 46 in dependence on the pressure values detected by at least one of the pressure sensors 78, 80.

Finally, three temperature sensors 86, 88, 90 are arranged within the collecting vessel 40 in order to detect the pressure prevailing in the atmosphere surrounding the particles 34, i.e. in the collecting vessel 40. A first temperature sensor 86 is arranged in a bottom region of the collecting vessel 40, a second temperature sensor 88 is arranged in a middle region of the collecting vessel 40 and a third temperature sensor 90 is arranged in a top region of the collecting vessel 40. Like the signals of the filling level sensor 48, the signals of the oxygen agent detector 76 and the signals of the pressure sensors 78, 80 also the signals of the temperature sensors 68, 88, 90 are transmitted to the control unit 46.

The particles 34 that are separated from the gas stream 32 by means of the separation device 36 are supplied to the collecting vessel 40. The supply of particles 34 to the collecting vessel 40 happens under the control of the control unit 46 and is started by opening the valve 44. The particles 34 may be supplied to the collecting vessel 40 either continuously or periodically, while the filling level of the collecting vessel 40 is continuously monitored by means of the filling level sensor 48 and the scale 50. When the particles 34 are accommodated in the collecting vessel 40, the particles 34 are stirred and/or revolved by means of the stirring and/or revolving device 51.

The supply of particles 34 to the collecting vessel 40 may be interrupted as required at any time, e.g., upon completion of the production of the three dimensional workpiece. However, at least when the filling level of the collecting vessel 40 with particles 34 has reached a first predetermined value that is determined by means of the filling level sensor 48 and the scale 50, the supply of particles 34 to the collecting vessel 40 is interrupted. In particular, the interruption of the supply of particles 34 to the collecting vessel 40 is achieved by closing the valve 44 under the control of the control unit 46 in response to the signals transmitted to the control unit 46 from the filling level sensor 48 and the scale 50.

Thereafter, oxidizing agent is supplied to the atmosphere surrounding the particles 34, i.e. to the collecting vessel 40 so as to cause a passivating oxidation of at least a part of the particles 34 contained in the collecting vessel 40. Specifically, the combustible and/or reactive particles 34 received within the collecting vessel 40, upon coming into contact with the oxidizing agent contained in the oxidizing mixture which is supplied to the atmosphere surrounding the particles 34 from the mixing chamber 54 of the oxidizing agent supply system 52, react with the oxidizing agent so as to form a passivating surface layer around the particles. The progress of the oxidation of the particles 34 is monitored by detecting the content of the oxidizing agent atmosphere surrounding the particles 34 by means of the oxidizing agent detector 76. Specifically, the oxidizing agent detector 76 is used to monitor the consumption of oxidizing agent in the oxidation reaction in order to form a passivating surface layer on the combustible and/or reactive particles 34.

The supply of the oxidation agent to the atmosphere surrounding the particles 34, by means of the control unit 46, is controlled in dependence on the detected content of the oxidizing agent in the atmosphere surrounding the particles 34 and hence in dependence on the status and the progress of the oxidation reaction occurring in the collecting vessel 40. As a result, a controlled oxidation and hence passivation of the combustible and/or reactive particles 34 is achieved. The supply of oxidizing agent to the atmosphere surrounding the particles 34 is controlled by suitably controlling the valve 74 which is arranged in the oxidizing mixture supply line 72 connecting the mixing chamber 54 of the oxidizing agent supply system 52 to the collecting vessel 40. In addition, the supply of oxidizing agent to the atmosphere surrounding the particles 34 is controlled by suitably controlling the content of the oxidizing agent in oxidizing mixture prepared in the mixing chamber 54 of the oxidizing agent supply system 52 as will be described in more detail below.

Figure 3:
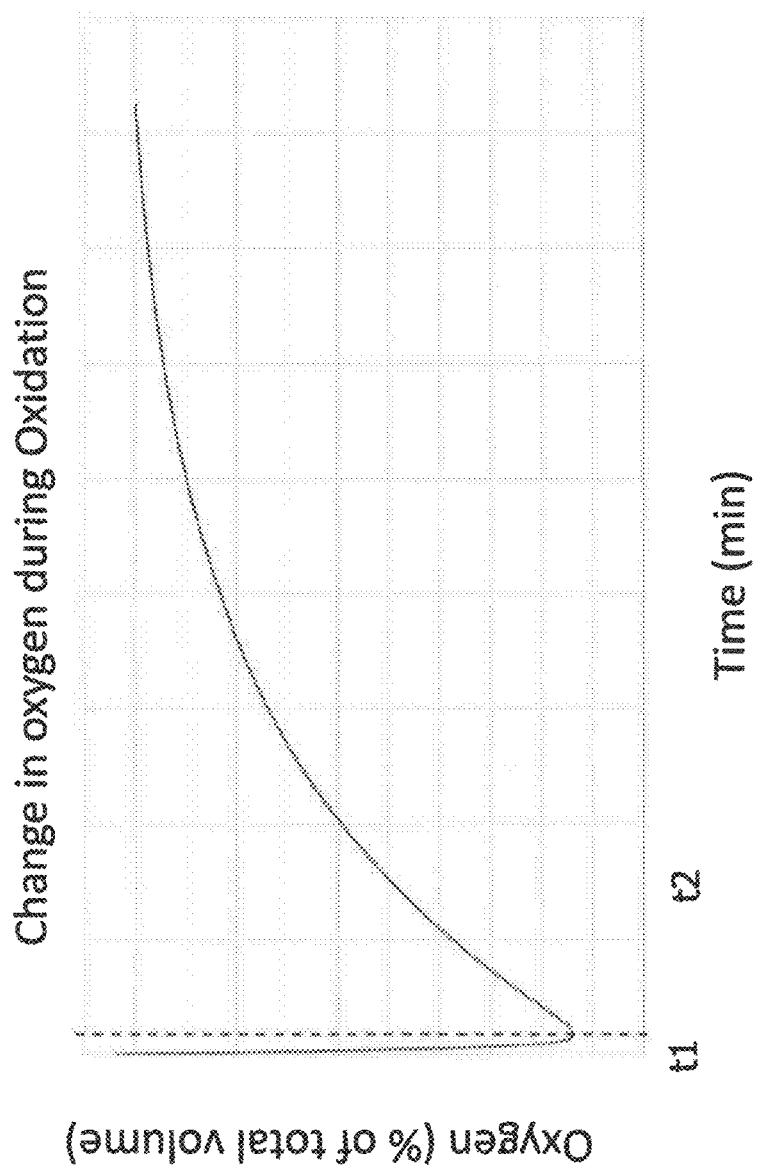
FIG. 3 shows a diagram indicating the development of a content of gaseous oxygen in a collecting vessel of the apparatus according to FIG. 2 during a process of treating the combustible and/or reactive particles in the apparatus of FIG. 2.

As becomes apparent from FIG. 3, the supply of the oxidizing agent to the atmosphere surrounding the particles 34 is controlled in such a manner that the content of gaseous oxygen in the atmosphere surrounding the particles 34, during a first period of time t1 following a start of the supply of the oxidizing agent to the atmosphere surrounding the particles 34, is maintained at a level which allows a passivating oxidation of at least a part of the particles, but which is lower than an ambient oxygen content or even lower than the Limiting Oxygen Concentration (LOC) for combustion of the particles of a particular material. This may be achieved by supplying a certain amount of oxidizing agent to the atmosphere surrounding the particles 34 and then interrupting the supply of the oxidizing agent to the atmosphere surrounding the particles 34 until the oxidizing agent in the atmosphere surrounding the particles 34 is consumed to a certain extent by the passivating oxidation of the combustible and/or reactive particles 34.

When the content of gaseous oxygen in the atmosphere surrounding the particles 34 has reached a desired level, the supply of the oxidizing agent to the atmosphere surrounding the particles 34 may be repeatedly started and interrupted as needed. Thus, during the first period of time t1 following the start of the supply of the oxidizing agent to the atmosphere surrounding the particles 34, several cycles of supplying oxygen agent to the atmosphere surrounding the particles 34 and interrupting the supply of oxygen agent of the atmosphere surrounding the particles 34 may be carried out.

To the contrary, during a second period of time t2 following the first period of time t1 and preceding a completion of the supply of the oxidizing agent to the atmosphere surrounding the particles 34, the supply of the oxidizing agent to the atmosphere surrounding the particles 34 is controlled in such a manner that the content of gaseous oxygen in the atmosphere surrounding the particles 34 increases and approximates the content of approximately 21%, i.e. the oxygen content of air. This reliably prevents an undesired reaction of the combustible and/or reactive particles 34 contained within the collecting vessel 40 when the particles 34, for example upon opening the collecting vessel 40, are exposed to air. During a later phase of the oxidation process, the reaction rate decreases due to the formation of passivating oxide layers on the surfaces of the combustible and/or reactive particles 34. Thus, an increase of the content of gaseous oxygen in the atmosphere surrounding the particles as shown in FIG. 3 ensures that there is always a sufficient amount of oxidizing agent present in the atmosphere surrounding the particles 34 in order to allow the formation of sufficiently thick passivating oxide layers on the surfaces of the particles 34 within a reasonable time.

Basically, the content of gaseous oxygen in the atmosphere surrounding the particles 34 may be increased by increasing the volume flow of oxidizing mixture to the atmosphere surrounding the particles 34, i.e. the collecting vessel 40. Preferably, however, the content of the oxidizing agent, i.e. gaseous oxygen in the oxidizing mixture is increased while the volume flow of oxidizing mixture to the atmosphere surrounding the particles 34 is maintained constant or only slightly increased. This is achieved by appropriately controlling the supply of oxidizing agent and the supply of diluting agent to the mixing chamber 54 of the oxidizing agent supply system 52.

It is, however, also conceivable that the supply of the oxidizing agent to the atmosphere surrounding the particles 34 is controlled in such a manner that a content of gaseous oxygen in the atmosphere surrounding the particles 34, during the second period of time t2 approximates an ambient oxygen content which differs from the oxygen content of air. This is advantageous in case the combustible and/or reactive particles 34 contained within the collecting vessel 40 should be exposed to an ambient atmosphere having an ambient oxygen content which differs from the oxygen content of air.

Figure 4:
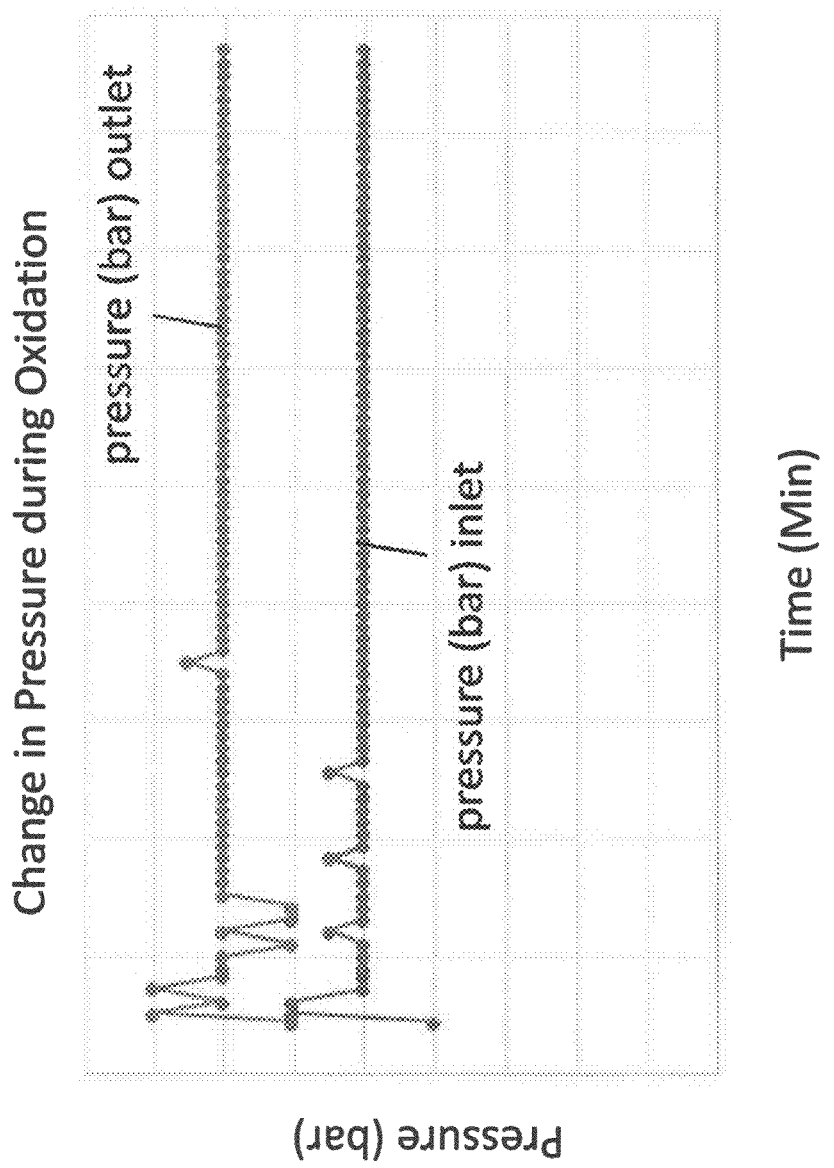
FIG. 4 shows a diagram indicating the development of a pressure in the collecting vessel of the apparatus according to FIG. 2 during a process of treating the combustible and/or reactive particles in the apparatus of FIG. 2.

FIG. 4 shows the development of a pressure in the collecting vessel 40 in dependence on the time. The lower curve in the diagram of FIG. 4 shows the development of the pressure in a region of the oxidizing aging inlet 56 as measured by the first pressure sensor 78. The upper curve in the diagram of FIG. 4 shows the development of the pressure in a region of the pressure control valve 84 as measured by the second pressure sensor 80.

In general, the supply of the oxidizing agent to the atmosphere surrounding the particles is controlled in dependence on the pressure in the atmosphere surrounding the particles 34 in such a manner that pressure variations and pressure peaks are avoided as far as possible. Specifically, the supply of the oxidizing agent to the atmosphere surrounding the particles is controlled in such a manner that the pressure in the atmosphere surrounding the particles 34 does not exceed a threshold value. The pressure in the collecting vessel 40 is controlled with the aid of the pressure control valve 84 and by suitably controlling the supply of oxidizing agent to the collecting vessel 40 in dependence on the pressure values detected by means of the pressure sensors 78, 80.

Basically, the oxidizing agent may be continuously supplied to the atmosphere surrounding the particles 34. Preferably, however, the oxidizing agent is supplied to the atmosphere surrounding the particles 34 in cycles. This is achieved by suitably controlling the valve 74. During a supply cycle of the oxidizing agent to the atmosphere surrounding the particles 34 a pressure equalisation in the collecting vessel 40 is achieved by suitably controlling the pressure control valve 84. Following the supply cycle of the oxidizing agent, i.e. after interrupting the supply of the oxidizing agent, a variation of the pressure hi the atmosphere surrounding the particles 34 is determined by the control unit 46 based on the signals provided by the pressure sensors 78, 80. A further supply cycle of the oxidizing agent to the atmosphere surrounding the particles 34 then is controlled by the control unit 46 in dependence on the determined pressure variation in the atmosphere surrounding the particles 34.

Figure 5:
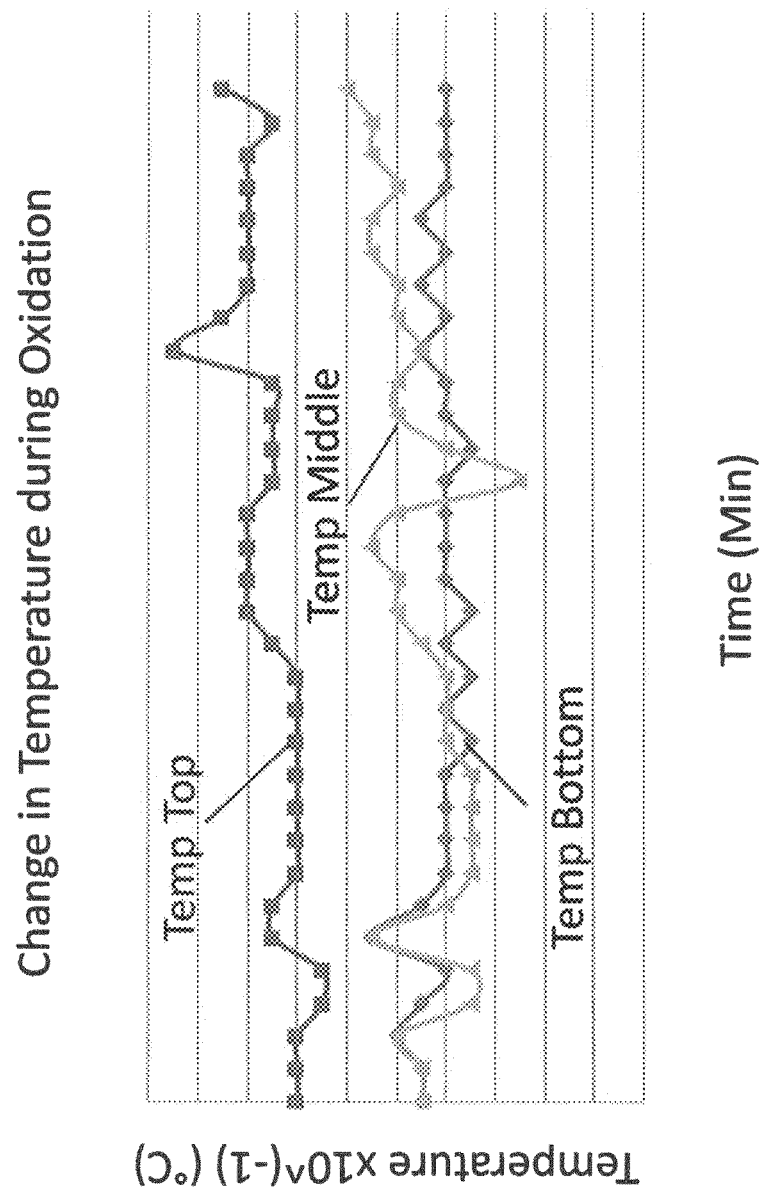
FIG. 5 shows a diagram indicating the development of a temperature in the collecting vessel of the apparatus according to FIG. 2 during a process of treating the combustible and/or reactive particles in the apparatus of FIG. 2.

The development of a temperature in the collecting vessel 40 in dependence on the time is shown in FIG. 5. The lower curve in the diagram of FIG. 5 shows the development of the temperature in a bottom region of the collecting vessel 40 as measured by the first temperature sensor 86. The middle curve in the diagram of FIG. 5 shows the development of the temperature in a middle region of the collecting vessel 40 as measured by the second temperature sensor 88. The upper curve in the diagram of FIG. 5 shows the development of the temperature in a top region of the collecting vessel 40 as measured by the third temperature sensor 90.

The supply of the oxidizing agent to the atmosphere surrounding the particles 34, i.e. in the collecting vessel 40 is controlled in such a manner that temperature variations are avoided as far as possible. Specifically, the supply of the oxidizing agent to the atmosphere surrounding the particles 34 is controlled in such a manner that the temperature in the atmosphere surrounding the particles 34 does not exceed a threshold value. For example, the temperature in the atmosphere surrounding the particles 34 may be controlled in such a manner that it does not exceed 45° C. The temperature in the collecting vessel 40 is controlled by suitably controlling the supply of oxidizing agent to the collecting vessel 40 in dependence on the temperature values detected by means of the temperature sensors 86, 88, 90.

Upon completion of the passivating oxidation of the combustible and/or reactive particles 34 contained in the collecting vessel 40, i.e. for example when the content of gaseous oxygen in the atmosphere surrounding the particles 34, i.e. in the collecting vessel 40 is approximately 21%, the supply of the oxidizing agent to the atmosphere surrounding the particles 34 is finally interrupted. The full collecting vessel 40 then is replaced by a replacement collecting vessel 40a. Specifically, the replacement collecting vessel 40a is connected to the connecting line 42 in place of the collecting vessel 40. After being disconnected from the connecting line 42, the full collecting vessel 40 may be closed by means of a cover (not shown).

During the interruption of the supply of particles 34 to the collecting vessel 40, the flow of the particle loaded gas stream through the separation device 36 and the operation of the separation device 36 are continued. Thus, even during the Interruption of the supply of particles 34 to the collecting vessel 40, the separation device 36 continues separating particles 34 from the gas stream 32. These particles 34 are temporarily stored in an interim storage volume 92 which may be provided in the interior of the separation device 36 as shown in the drawing or which may be provided in a separate container. In particular, the particles 34 that are separated from the gas stream 32 during the interruption of the supply of particles 34 to the collecting vessel 40 maintain in the filter 38 of the separation device 36. Hence, continuous operation of the system 100 is made possible.

The invention claimed is:

1. A method for treating combustible and/or reactive particles which have been separated from a gas stream by means of a separation device, the method comprising:
   supplying an oxidizing agent to an atmosphere surrounding the particles separated from the gas stream so as to cause a passivating oxidation of at least a part of the particles;
   detecting a content of the oxidizing agent in the atmosphere surrounding the particles; and
   controlling the supply of the oxidizing agent to the atmosphere surrounding the particles in dependence on the detected content of the oxidizing agent in the atmosphere surrounding the particles,
   wherein the oxidizing agent and a diluting agent are separately supplied to the atmosphere surrounding the particles so as to form an oxidizing mixture in the atmosphere surrounding the particles, wherein the supply of oxidizing agent and the supply of diluting agent to the atmosphere surrounding the particles and/or to the mixing chamber are controlled in such a manner that the content of the oxidizing agent in the oxidizing mixture increases over time.

2. The method according to claim 1,
   wherein the particles separated from the gas stream are supplied to a collecting vessel, wherein the oxidizing agent is supplied to the collecting vessel, wherein a content of the oxidizing agent in the collecting vessel is detected, and wherein a supply of the oxidizing agent to the collecting vessel is controlled in dependence on the detected content of the oxidizing agent in the collecting vessel.

3. The method according to claim 1,
   wherein the supply of the oxidizing agent to the atmosphere surrounding the particles is controlled in such a manner that the content of gaseous oxygen in the atmosphere surrounding the particles, at least during a first period of time following a start of the supply of the oxidizing agent to the atmosphere surrounding the particles is maintained at a level which allows a passivating oxidation of at least a part of the particles, but which is lower than an ambient oxygen content; and/or
   wherein the supply of the oxidizing agent to the atmosphere surrounding the particles is controlled in such a manner that the content of gaseous oxygen in the atmosphere surrounding the particles, at least during a first period of time following a start of the supply of the oxidizing agent to the atmosphere surrounding the particles is maintained at a level which allows a passivating oxidation of at least a part of the particles, but which is lower than a Limiting Oxygen Concentration for combustion of that particles from a particular material; and/or
   wherein the supply of the oxidizing agent to the atmosphere surrounding the particles is controlled in such a manner that a content of gaseous oxygen in the atmosphere surrounding the particles, at least during a second period of time preceding a completion of the supply of the oxidizing agent to the atmosphere surrounding the particles, approximates an ambient oxygen content of approximately 21%.

4. The method according to claim 1, further comprising:
   stirring and/or revolving the particles separated from the gas stream.

5. The method according to claim 1, further comprising controlling the supply of the oxidizing agent to the atmosphere surrounding the particles in dependence on a pressure in the atmosphere surrounding the particles, wherein the supply of the oxidizing agent to the atmosphere surrounding the particles is controlled in such a manner that the pressure in the atmosphere surrounding the particles does not exceed a threshold value.

6. The method according to claim 5,
   wherein
   the oxidizing agent is supplied to the atmosphere surrounding the particles in cycles;
   following a supply cycle of the oxidizing agent, a variation of the pressure in the atmosphere surrounding the particles is determined; and
   a further supply cycle of the oxidizing agent to the atmosphere surrounding the particles is controlled in dependence on the determined pressure variation in the atmosphere surrounding the particles.

7. A method of operating a system for producing a three-dimensional work piece by irradiating layers of a raw material powder with electromagnetic or particle radiation, the method comprising:
   supplying a gas stream to a process chamber of the system;
   directing the gas stream through the process chamber, wherein the gas stream, while being directed through the process chamber takes up combustible and/or reactive particles;
   discharging the gas stream containing the combustible and/or reactive particles from the process chamber;
   separating the combustible and/or reactive particles from the gas stream by means of a separation device; and
   treating the combustible and/or reactive particles separated from the gas stream in accordance with the method as defined in claim 1.

* * * * *